Nov. 3, 1931.                 G. H. BOS                 1,830,383
COVER FOR AUTOMOBILE DOOR HANDLES
Filed July 29, 1929
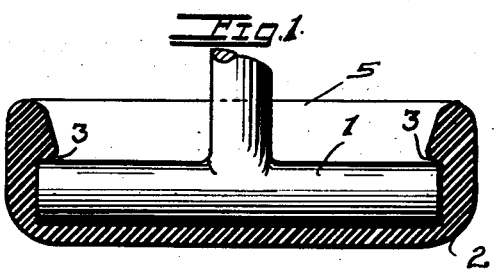
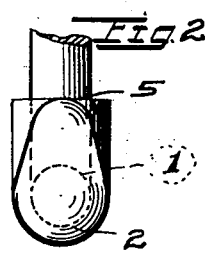
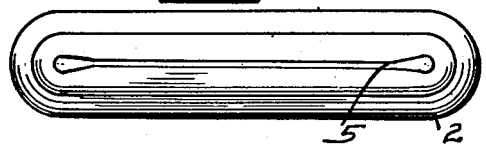
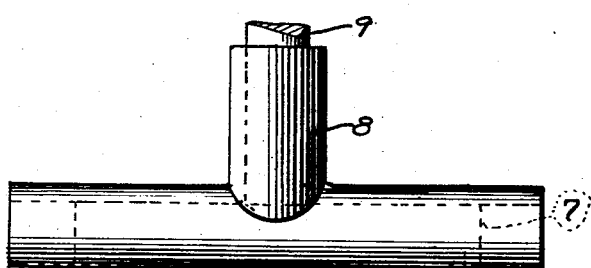
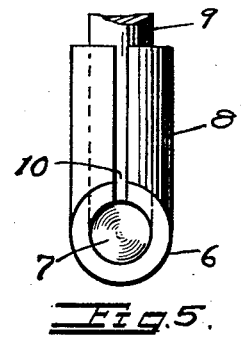
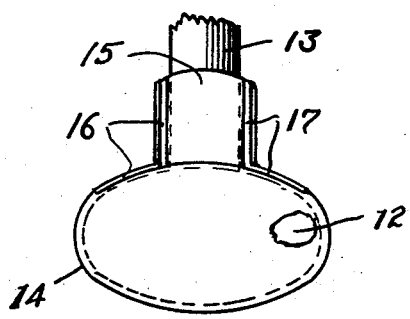
Inventor
Georges H. Bos.
By Baldwin Vale
Attorney Patented Nov. 3, 1931

1,830,383

UNITED STATES PATENT OFFICE

GEORGES H. BOS, OF SAN FRANCISCO, CALIFORNIA, ASSIGNOR OF ONE-HALF TO WILLIAM LONG, OF SAN FRANCISCO, CALIFORNIA

COVER FOR AUTOMOBILE DOOR HANDLES

Application filed July 29, 1929. Serial No. 381,842.

This invention relates to improvements in covers for automobile door handles, and more particularly to resilient protective covering for the door handles of automobiles undergoing repair or handling by garage mechanics.

Among the objects of the invention are to provide a simple covering that can be slipped over the handle readily and can be quickly removed, but remains securely in the place until removed.

Another object of this invention is the provision of a protective covering for the handle, and also for the shank of the handle for some distance from the joint of the handle and shank.

Another object of this invention is to provide a protective covering for any shape of handle or knob, to prevent adjacent objects against which the door may be swung from being injured.

Another object is to provide a cover for handles to protect other cars from being scratched when the door is opened in a crowded space.

Other objects will appear as the description progresses.

In this specification and the accompanying drawings, the invention is disclosed in the form considered to be the best, but I do not wish to be understood as limiting it to this form because it may be embodied in other forms. It is also to be understood that in and by the claims following the description it is desired to cover the invention in whatsoever form it may be embodied.

In the accompanying one sheet of drawings,

Figure 1 is an elevation of an automobile door handle and part of the shank, showing the cover in longitudinal section.

Figure 2 is an end view of the device shown in Figure 1.

Figure 3 is a view of the cover showing the open side thereof.

Figure 4 is a view of a modified form of the invention.

Figure 5 is an end view of the form shown in Figure 4.

Figure 6 is a perspective view of a knob having a protective covering.

The cover for the automobile handle is preferably made of resilient material, such as rubber. It is placed on the handle 1 by stretching the cover 2 lengthways and slipping it over the ends so that the inturned portions 3 of the thickened ends will impinge on the ends of the handle and be securely retained thereon.

The open side 5 extends far enough over the handle to afford ample protection for the inside of the handle.

In the embodiment shown in Figures 4 and 5 the cover is made in the form of a tubular T split so the portion 6 will cover the handle 7, and the portion 8 will cover the shank 9.

The split 10 extends through the back edge and through the portion 8 so that the cover may be slipped over the handle and be retained thereon by the resilience of the material.

In the form of the invention shown in Figure 6, a knob 12 is shown which may be round or oval, in this instance an oval knob is illustrated having the bolt 13. The elastic protective cover 14 has the extension 15 to cover the bolt or shank. The cover and extension is split at 16 and 17 to allow readily slipping the cover on, although the rubber could be sufficiently elastic so that it could be stretched over the knob without the slits in the sides.

The present invention has been found to be very effective in protecting handles of automobile doors from the greasy hands of mechanics who were working on the machine.

The cover may be applied or removed without touching the handle with the fingers.

Another advantageous use of this cover for handles or knobs is the protection it affords other cars or the walls against which the door may be opened.

Having thus described my invention, what I claim and desire to secure by Letters Patent is:

1. A cover for handles comprising a resilient body having an opening on one side thereof, said cover being internally recessed to receive the ends of the handle, and a flange on said body extending over a portion of the shank of the handle.

2. A cover for handles comprising an elongated resilient body having an opening in one side of said body, said body being thickened at each end, inturned lugs at each end of the opening in said body and adapted to engage the ends of the handle inserted therein, and a flange extending from the open side of said body.

In testimony whereof I have hereunto set my hand this 20th day of July, A. D. 1929.

GEORGES H. BOS.